(12) United States Patent
Hetzner

(10) Patent No.: US 11,712,644 B2
(45) Date of Patent: *Aug. 1, 2023

(54) DURABLE, COLLAPSIBLE, AND CONFIGURABLE STRAINER BASKET FOR POOL EQUIPMENT

(71) Applicant: Jess L. Hetzner, Temecula, CA (US)

(72) Inventor: Jess L. Hetzner, Temecula, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/585,313

(22) Filed: Jan. 26, 2022

(65) Prior Publication Data
US 2022/0395769 A1    Dec. 15, 2022

Related U.S. Application Data

(63) Continuation of application No. 16/938,193, filed on Jul. 24, 2020, now Pat. No. 11,266,929, which is a continuation of application No. 16/863,749, filed on Apr. 30, 2020, now Pat. No. 10,722,827.

(60) Provisional application No. 62/845,691, filed on May 9, 2019.

(51) Int. Cl.
   *B01D 29/25*    (2006.01)
   *E04H 4/12*     (2006.01)
   *B01D 35/30*    (2006.01)

(52) U.S. Cl.
   CPC .......... *B01D 29/25* (2013.01); *B01D 35/30* (2013.01); *E04H 4/1209* (2013.01)

(58) Field of Classification Search
   CPC ........ B01D 29/25; B01D 35/30; E04H 4/1209
   USPC ............................. 210/167.1, 232, 238, 448
   See application file for complete search history.

(56) References Cited

U.S. PATENT DOCUMENTS

| | | | |
|---|---|---|---|
| 4,325,150 | A | 4/1982 | Buddy |
| 4,725,352 | A | 2/1988 | Halliotis |
| D377,249 | S | 1/1997 | Granshaw |
| 5,672,271 | A | 9/1997 | Dye |
| 5,830,350 | A | 11/1998 | Voss et al. |

(Continued)

FOREIGN PATENT DOCUMENTS

| | | |
|---|---|---|
| AU | 202013309 | 9/2020 |
| AU | 202015212 | 12/2020 |

(Continued)

OTHER PUBLICATIONS

International Search Report and Written Opinion for application No. PCT/US2020/030792, dated Aug. 7, 2020, in 9 pages.
U.S. Appl. No. 29/717,382, filed Feb. 17, 2019, Hetzner.

*Primary Examiner* — Fred Prince
(74) *Attorney, Agent, or Firm* — Knobbe, Martens, Olson & Bear, LLP

(57) ABSTRACT

A durable and collapsible strainer basket for pool equipment includes a rigid annular top portion having a radially extending rim; and a flexible basket extending downward from the rigid annular top portion, the rim of the rigid annular top portion including a downward facing surface that extends radially outward beyond the flexible basket and that is positioned to rest on a ledge of a pool equipment cavity, wherein the flexible basket includes a tapered outer shape formed by two or more flexible silicone annular sections having a plurality of holes passing therethrough, wherein the two or more flexible silicone annular sections are configured to be collapsible such that the flexible basket includes a collapsed configuration and an expanded configuration.

20 Claims, 13 Drawing Sheets

(56) References Cited

U.S. PATENT DOCUMENTS

| | | |
|---|---|---|
| 5,840,188 A | 11/1998 | Kirsgalvis |
| 5,862,541 A | 1/1999 | Mailhot |
| 5,888,386 A | 3/1999 | Enright et al. |
| 5,989,421 A | 11/1999 | Davis |
| 6,592,756 B1 | 7/2003 | Felix, Jr. et al. |
| 6,716,342 B1 | 4/2004 | Tilsner |
| 6,979,401 B1 | 12/2005 | Porter |
| D550,805 S | 9/2007 | Hazlehurst |
| D557,374 S | 12/2007 | Pecca |
| 7,314,553 B1 | 1/2008 | Barbe |
| D600,324 S | 9/2009 | Vreeland |
| D620,999 S | 8/2010 | Vreeland |
| 7,815,797 B1 | 10/2010 | Keith |
| D649,220 S | 11/2011 | Vreeland |
| D694,851 S | 12/2013 | Solakian |
| D720,960 S | 1/2015 | Ko et al. |
| D749,706 S | 2/2016 | Johansen |
| 9,260,877 B2 | 2/2016 | Lopez |
| D766,656 S | 9/2016 | MacInnis et al. |
| D824,009 S | 7/2018 | Kim et al. |
| 10,029,932 B2 | 7/2018 | King et al. |
| 10,138,644 B1 | 11/2018 | Piepenburg |
| D868,206 S | 11/2019 | Carrière et al. |
| 10,722,827 B1 | 7/2020 | Hetzner |
| 10,890,005 B2 | 1/2021 | Ramos |
| 11,111,163 B2 | 9/2021 | Carley et al. |
| 11,266,929 B2 | 3/2022 | Hetzner |
| D948,825 S | 4/2022 | Tsui |
| 11,332,951 B2 | 5/2022 | Jackson |
| D967,328 S | 10/2022 | Speak |
| 11,499,329 B2 | 11/2022 | Schmidt |
| 2003/0196950 A1 | 10/2003 | Kraft |
| 2004/0045895 A1 | 3/2004 | Bonelli et al. |
| 2008/0073257 A1 | 3/2008 | Foley |
| 2008/0230462 A1 | 9/2008 | Curtin |
| 2009/0243318 A1 | 10/2009 | Pratt |
| 2010/0122949 A1 | 5/2010 | Van Der Meijden et al. |
| 2014/0263101 A1 | 9/2014 | Voss Weyman |
| 2015/0343349 A1 | 12/2015 | Wells et al. |
| 2015/0354242 A1 | 12/2015 | Saccoccio et al. |
| 2016/0010353 A1 | 1/2016 | Giroux et al. |
| 2016/0023138 A1 | 1/2016 | Kurani |
| 2021/0017782 A1 | 1/2021 | Jackson |
| 2022/0055922 A1 | 2/2022 | Mendez et al. |
| 2022/0119291 A1 | 4/2022 | Murphy |

FOREIGN PATENT DOCUMENTS

| | | |
|---|---|---|
| AU | 202016684 | 1/2021 |
| AU | 202016686 | 1/2021 |
| ES | 0531636 | 7/2020 |
| WO | WO 2018/195591 A1 * | 11/2018 |
| WO | WO 2020/227021 | 11/2020 |

* cited by examiner

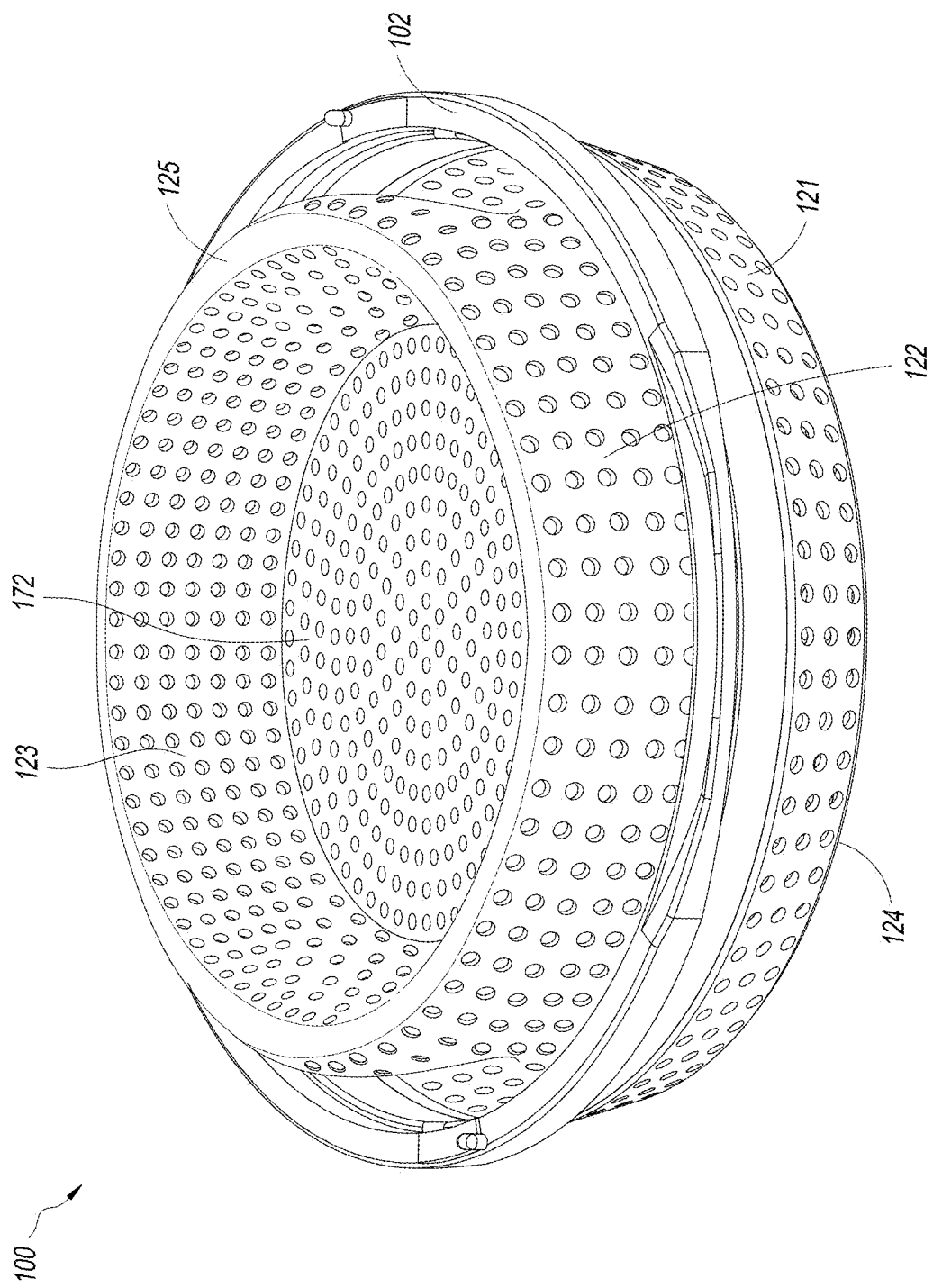

DURABLE, COLLAPSIBLE, AND CONFIGURABLE STRAINER BASKET FOR POOL EQUIPMENT

CROSS-REFERENCE TO RELATED APPLICATIONS

This application is a continuation of U.S. patent application Ser. No. 16/938,193, titled DURABLE, COLLAPSIBLE, AND CONFIGURABLE STRAINER BASKET FOR POOL EQUIPMENT, filed on Jul. 24, 2020, which is a continuation of U.S. patent application Ser. No. 16/863,749, titled DURABLE, COLLAPSIBLE, AND CONFIGURABLE STRAINER BASKET FOR POOL EQUIPMENT, filed on Apr. 30, 2020, which claims the benefit of U.S. Provisional Application No. 62/845,691, titled DURABLE, COLLAPSIBLE, AND CONFIGURABLE STRAINER BASKET FOR POOL EQUIPMENT, filed on May 9, 2019. Each of the foregoing applications is hereby incorporated by reference herein in its entirety.

BACKGROUND

Field

This disclosure relates generally to strainer baskets, and more specifically to strainer baskets for pool equipment.

Description

Swimming pool equipment operates in relatively harsh environments, subject to extreme temperatures and harsh chemicals. Debris is also constantly being collected in swimming pools and needs to be filtered out or otherwise removed in order to keep the pool clean and sanitary. Typically, a swimming pool comprises one or more pumps that draw water and debris from the pool and force them through a filter that filters out even very small particulate debris. In order to extend the life of such filters and pumps, however, it can be desirable to utilize one or more pre-filters to filter out relatively large debris, such as leaves, before that debris gets to the pump. Many swimming pools include one or more skimmers that are designed to collect such larger debris. A skimmer typically including a removable strainer basket that collects such debris as pool water is sucked through the basket. Skimmer baskets often break and need to be replaced regularly, due to the harsh environment they operate in and/or due to abuse of the basket by a user maintaining the pool. As such, there is a need for improved baskets that are more durable and/or solve a number of other problems discussed herein.

SUMMARY

The disclosure herein presents durable, collapsible, and/or configurable strainer baskets for pool equipment. In some embodiments, a strainer basket comprises a rigid annular member connected to a flexible basket portion. In some embodiments, the rigid annular member may have a variety of features that enable it to be used in a variety of different configurations of pool equipment. The features may include, for example, one or more interrupted portions in an outer diameter of the rigid annular member, one or more tabs or posts protruding from the rigid annular member, and/or the like. Further, in some embodiments, a second rigid annular member is configured to be coupled to the first rigid annular member to enable the strainer basket to be used with even more configurations of pool equipment. For example, the second rigid annular member may have an outer diameter that is larger than an outer diameter of the first rigid annular member. In some embodiments, the flexible basket portion comprises a durable, heat resistant material, such as silicone. Further, in some embodiments, the flexible basket portion is shaped in a generally tapered configuration and comprises one or more annular fold regions that allow the flexible basket member to collapse down to a smaller size.

According to some embodiments, a durable and configurable strainer basket for pool equipment comprises: a first rigid annular member comprising a central opening, a radially extending rim, and a longitudinally extending basket support portion, the first rigid annular member comprising a rigid polymer material, the radially extending rim comprising an outer surface sized to fit within a first pool equipment cavity having a first diameter, the rim further comprising a lower surface sized to rest on a ledge of the first pool equipment cavity; a handle having a first end and a second end, the first end of the handle connected to the first rigid annular member at a first location, and the second end of the handle connected to the first rigid annular member at a second location opposite the first location; a second rigid annular member removably coupleable to the first rigid annular member, the second rigid annular member comprising an outer surface sized to fit within a second pool equipment cavity having a second diameter larger than the first diameter, but not to fit within the first pool equipment cavity having the first diameter; and a flexible basket permanently attached to the basket support portion of the first rigid annular member, wherein the flexible basket comprises a tapered outer shape formed by at least two flexible silicone annular sections that each have a plurality of holes passing therethrough, wherein the at least two flexible silicone annular sections are configured to be collapsible within one another such that the flexible basket comprises a collapsed configuration and an expanded configuration, and wherein the at least two flexible silicone annular sections comprises a bottom flexible silicone annular section that is connected to a horizontal silicone floor of the flexible basket, the bottom flexible silicone annular section configured such that it is positioned fully below the first rigid annular member when the flexible basket is in the expanded configuration, and positioned at least partially within the central opening of the first rigid annular member when the flexible basket is in the collapsed configuration.

In some embodiments, the at least two flexible silicone annular sections of the flexible basket comprises at least three flexible silicone annular sections. In some embodiments, the basket support portion of the first rigid annular member comprises a longitudinally downwardly extending member that is adhered with an adhesive at a joint on a side surface to a side surface of a longitudinally upwardly extending member of the flexible basket. In some embodiments, a height of the joint is at least 5 millimeters. In some embodiments, the at least two flexible silicone annular sections and the horizontal silicone floor comprise a shape and thickness sufficient to position a center of gravity of the strainer basket below a longitudinal center point of the strainer basket. In some embodiments, the silicone material of the at least two flexible silicone annular sections and the horizontal silicone floor comprises a thickness of at least 2 millimeters. In some embodiments, the longitudinally extending basket support portion comprises a plurality of tapered tabs positioned to retain the second rigid annular member in place between a bottom surface of the radially extending rim and a top surface of the tapered tabs. In some embodiments, the rim of the first rigid annular member comprises at least one radially recessed portion configured to enable locking of the strainer basket into the first pool equipment cavity by rotating the strainer basket about a longitudinal axis after inserting the strainer basket into the first pool equipment cavity. In some embodiments, the flexible basket comprises a one-piece molded silicone structure.

According to some embodiments, a durable and configurable strainer basket for pool equipment comprises: a first rigid annular member comprising a central opening, a radially extending rim, and a longitudinally extending basket support portion, the rim comprising an outer surface sized to fit within a first pool equipment cavity having a first diameter, the rim further comprising a lower surface sized to rest on a ledge of the first pool equipment cavity; a second rigid annular member removably coupleable to the first rigid annular member, the second rigid annular member comprising an outer surface sized to fit within a second pool equipment cavity having a second diameter larger than the first diameter, but not to fit within the first pool equipment cavity having the first diameter; and a flexible basket permanently attached to the basket support portion of the first rigid annular member, wherein the flexible basket comprises a silicone material having a plurality of holes passing therethrough.

In some embodiments, the flexible basket comprises a tapered outer shape formed by at least two annular sections configured to be collapsible within one another. In some embodiments, the first and second rigid annular members comprise a polymer having greater rigidity than the silicone material of the flexible basket. In some embodiments, the second rigid annular member is removably coupleable to the first rigid annular member using at least one of the following methods: a snap fit, a friction fit, or a twist lock. In some embodiments, the longitudinally extending basket support portion comprises a plurality of tapered tabs positioned to retain the second rigid annular member in place between the lower surface of the radially extending rim and a top surface of the tapered tabs. In some embodiments, the radially extending rim of the first rigid annular member comprises one or more cavities extending upward from the lower surface of the rim, and wherein the second rigid annular member comprises one or more protruding members extending upward from a surface of the second rigid annular member, the one or more protruding members sized and positioned to extend into the one or more cavities of the rim when the second rigid annular member is coupled to the first rigid annular member. In some embodiments, when the second rigid annular member is coupled to the first rigid annular member, the lower surface of the rim of the first rigid annular member abuts an upper surface of the second rigid annular member, and a lower surface of the second rigid annular member is sized and positioned to rest on a ledge of the second pool equipment cavity. In some embodiments, when the second rigid annular member is coupled to the first rigid annular member, the rim of the first rigid annular member is at least partially recessed within a cavity of the second rigid annular member such that a top surface of the rim of the first rigid annular member does not protrude upwardly beyond a top surface of the second rigid annular member, or such that the top surface of the rim of the first rigid annular member protrudes upwardly beyond the top surface of the second rigid annular member by a distance less than a height of the rim of the first rigid annular member. In some embodiments, the silicone material of the flexible basket comprises a shape and thickness sufficient to position a center of gravity of the strainer basket below a longitudinal center point of the strainer basket. In some embodiments, the silicone material of the flexible basket comprises a shape and thickness sufficient to position a center of gravity of the strainer basket within a bottom ⅓ of a longitudinal height of the strainer basket. In some embodiments, the flexible basket comprises a weight coupled to or molded within the silicone material. In some embodiments, the flexible basket comprises one or more stiffening ribs coupled to or molded within the silicone material to increase a rigidity of the flexible basket in one or more regions of the flexible basket. In some embodiments, the basket support portion of the first rigid annular member comprises a longitudinally downwardly extending member that is adhered at a joint on a side surface to a side surface of a longitudinally upwardly extending member of the flexible basket. In some embodiments, a height of the joint is approximately 5 millimeters. In some embodiments, a height of the joint is at least 5 millimeters. In some embodiments, a height of the joint is at least 4 millimeters. In some embodiments, the basket support portion of the first rigid annular member comprise a cavity extending upward within the basket support portion, and wherein the flexible basket comprises an upper portion extending within and coupled to the cavity of the basket support portion. In some embodiments, the upper portion of the flexible basket comprises silicone material molded to the basket support portion. In some embodiments, the upper portion of the flexible basket comprises silicone material adhered to the basket support portion. In some embodiments, the cavity of the basket support portion comprises at least one radially protruding member engaging the upper portion of the flexible basket to resist pullout of the upper portion of the flexible basket from the cavity of the basket support portion. In some embodiments, the strainer basket further comprises a rod coupled to the first rigid annular member and extending across the central opening of the first rigid annular member, the rod configured to enable a user to position the strainer basket within the first or second pool equipment cavities. In some embodiments, the rim of the first rigid annular member comprises at least one recessed portion configured to enable locking of the strainer basket into the first pool equipment cavity by the user twisting the strainer basket using the rod after inserting the strainer basket into the first pool equipment cavity.

According to some embodiments, a durable and collapsible strainer basket for pool equipment comprises: a first rigid annular member comprising a central opening, a radially extending rim, and a longitudinally extending basket support portion, the rim comprising an outer surface sized to fit within a first pool equipment cavity having a first diameter, the rim further comprising a lower surface sized to rest on a ledge of the first pool equipment cavity; a flexible basket permanently attached to the basket support portion of the first rigid annular member, wherein the flexible basket comprises a tapered outer shape formed by at least two flexible silicone annular sections that each have a plurality of holes passing therethrough, wherein the at least two flexible silicone annular sections are configured to be collapsible such that the flexible basket comprises a collapsed configuration and an expanded configuration, and wherein the at least two flexible silicone annular sections comprises a bottom flexible silicone annular section that is connected to a horizontal floor of the flexible basket, the bottom flexible silicone annular section configured such that it is positioned fully below the first rigid annular member when the flexible basket is in the expanded configuration and positioned at least partially within the central opening of the first rigid annular member when the flexible basket is in the collapsed configuration.

In some embodiments, the first rigid annular member comprises a rigid polymer material. In some embodiments, a height of the strainer basket, measured longitudinally from an uppermost surface of the strainer basket to a lowermost surface of the strainer basket, comprises a first height when the flexible basket is in the collapsed configuration and a second height when the flexible basket is in the expanded configuration, wherein the first height is no more than 50% of the second height. In some embodiments, the first height is no more than 40% of the second height. In some embodiments, the basket support portion of the first rigid annular member comprises a longitudinally downwardly extending member that is adhered with an adhesive at a joint on a side surface to a side surface of a longitudinally upwardly extending member of the flexible basket. In some embodiments, a height of the joint is at least 5 millimeters. In some embodiments, a height of the joint is at least 10 millimeters. In some embodiments, the silicone material of the flexible basket comprises a shape and thickness sufficient to position a center of gravity of the strainer basket below a longitudinal center point of the strainer basket. In some embodiments, the silicone material of the flexible basket comprises a thickness of at least 2 millimeters.

According to some embodiments, a durable and configurable strainer basket for pool equipment comprises: a first rigid annular member comprising a central opening, a radially extending rim, and a longitudinally extending basket support portion, the rim comprising an outer surface sized to fit within a first pool equipment cavity having a first diameter, the rim further comprising a lower surface sized to rest on a shelf of the first pool equipment cavity; a second rigid annular member removably coupleable to the first rigid annular member, the second rigid annular member comprising an outer surface sized to fit within a second pool equipment cavity having a second diameter larger than the first diameter, but not to fit within the first pool equipment cavity having the first diameter; and a flexible basket permanently attached to the basket support portion of the first rigid annular member, wherein the flexible basket comprises a silicone material having a plurality of holes passing therethrough.

In some embodiments, the flexible basket comprises a tapered outer shape formed by at least three annular sections configured to be collapsible within one another. In some embodiments, the first and second rigid annular members comprise a polymer having greater rigidity than the silicone material of the flexible basket. In some embodiments, the second rigid annular member is removably coupleable to the first rigid annular member using at least one of the following methods: a snap fit, a friction fit, or a twist lock. In some embodiments, the longitudinally extending basket support portion comprises a plurality of tapered tabs positioned to retain the second rigid annular member in place between a bottom surface of the radially extending rim and a top surface of the tapered tabs. In some embodiments, the radially extending rim of the first rigid annular member comprises one or more cavities extending upward from the lower surface of the rim, and wherein the second rigid annular member comprises one or more protruding members extending upward from a surface of the second rigid annular member, the one or more protruding members sized and positioned to form a friction fit with the one or more cavities of the rim when the second rigid annular member is coupled to the first rigid annular member. In some embodiments, when the second rigid annular member is coupled to the first rigid annular member, the lower surface of the rim of the first rigid annular member abuts an upper surface of the second rigid annular member, and a lower surface of the second rigid annular member is sized and positioned to rest on a shelf of the second pool equipment cavity. In some embodiments, when the second rigid annular member is coupled to the first rigid annular member, the rim of the first rigid annular member is at least partially recessed within a cavity of the second rigid annular member such that a top surface of the rim of the first rigid annular member does not protrude upwardly beyond a top surface of the second rigid annular member, or such that the top surface of the rim of the first rigid annular member protrudes upwardly beyond the top surface of the second rigid annular member by a distance less than a height of the rim of the first rigid annular member. In some embodiments, the silicone material of the flexible basket comprises a shape and thickness sufficient to position a center of gravity of the strainer basket below a longitudinal center point of the strainer basket. In some embodiments, the silicone material of the flexible basket comprises a shape and thickness sufficient to position a center of gravity of the strainer basket within a bottom ⅓ of a longitudinal height of the strainer basket. In some embodiments, the flexible basket comprises a weight coupled to or molded within the silicone material. In some embodiments, the flexible basket comprises one or more stiffening ribs coupled to or molded within the silicone material to increase a rigidity of the flexible basket in one or more regions of the flexible basket. In some embodiments, the basket support portion of the first rigid annular member comprises a longitudinally downwardly extending member that is adhered at a joint on a side surface to a side surface of a longitudinally upwardly extending member of the flexible basket. In some embodiments, a height of the joint is approximately 5 millimeters. In some embodiments, a height of the joint is at least 5 millimeters. In some embodiments, a height of the joint is at least 4 millimeters. In some embodiments, the basket support portion of the first rigid annular member comprise a cavity extending upward within the basket support portion, and wherein flexible basket comprises an upper portion extending within and coupled to the cavity of the basket support portion. In some embodiments, the upper portion of the flexible basket comprises silicone material molded to the basket support portion. In some embodiments, the upper portion of the flexible basket comprises silicone material adhered to the basket support portion. In some embodiments, the cavity of the basket support portion comprises at least one radially protruding member engaging the upper portion of the flexible basket to resist pullout of the upper portion of the flexible basket from the cavity of the basket support portion. In some embodiments, the strainer basket further comprises a rod coupled to the first rigid annular member and extending across the central opening of the first rigid annular member, the rod configured to enable a user to position the strainer basket within the first or second pool equipment cavities. In some embodiments, the rim of the first rigid annular member comprises at least one recessed portion configured to enable locking of the strainer basket into the first pool equipment cavity by the user twisting the strainer basket using the rod after inserting the strainer basket into the first pool equipment cavity.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The features of some embodiments of the present disclosure, which are believed to be novel, will be more fully disclosed in the following detailed description. The following detailed description may best be understood by reference to the accompanying drawings wherein the same numbers in different drawings represents the same parts. All drawings are schematic and are not intended to show any dimension to scale. The drawings comprise the following figures in which:

FIG. 1H illustrates a top perspective view of the collapsible strainer basket of FIG. 1A in a collapsed configuration.

DETAILED DESCRIPTION

Figure 1A:
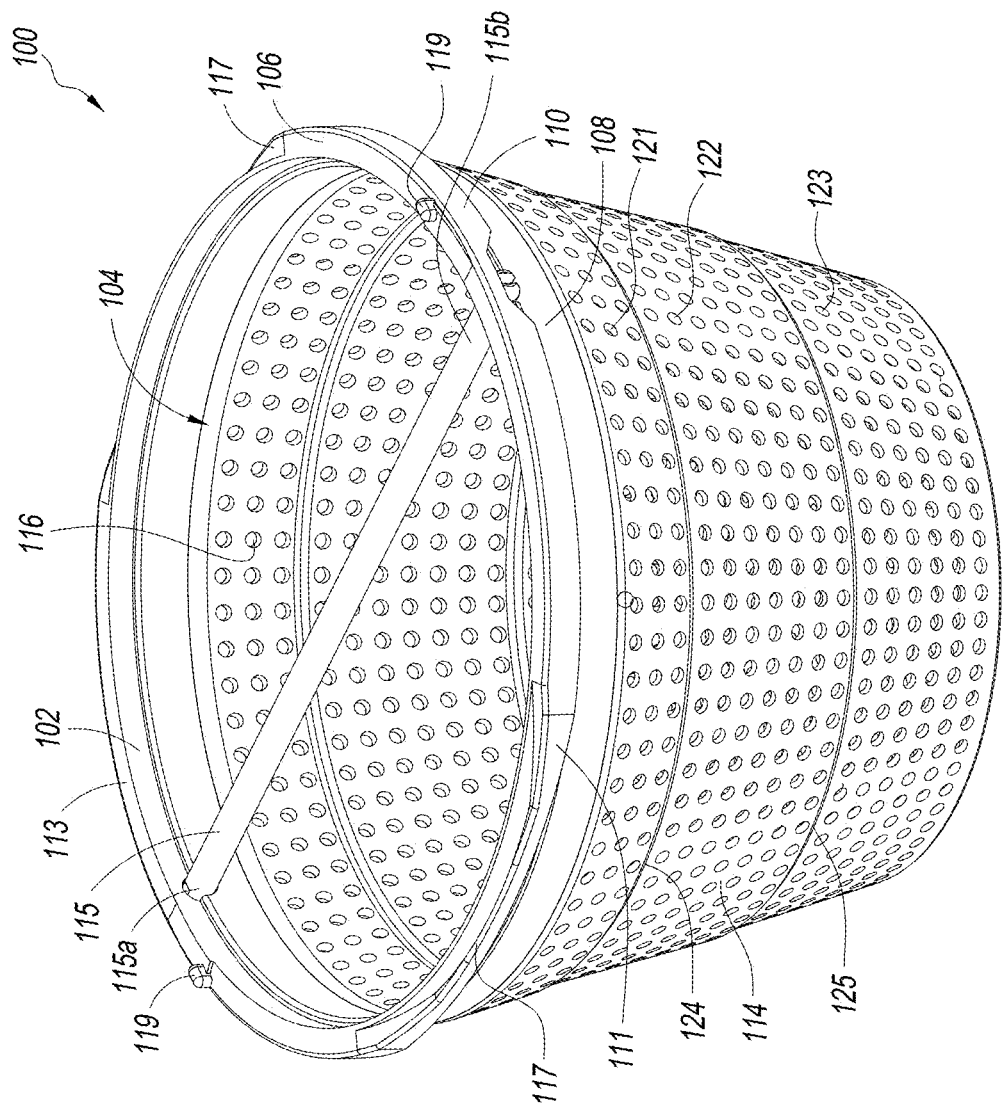
FIG. 1A illustrates a top perspective view of a collapsible strainer basket in an expanded configuration according to one embodiment.
Figure 1B:
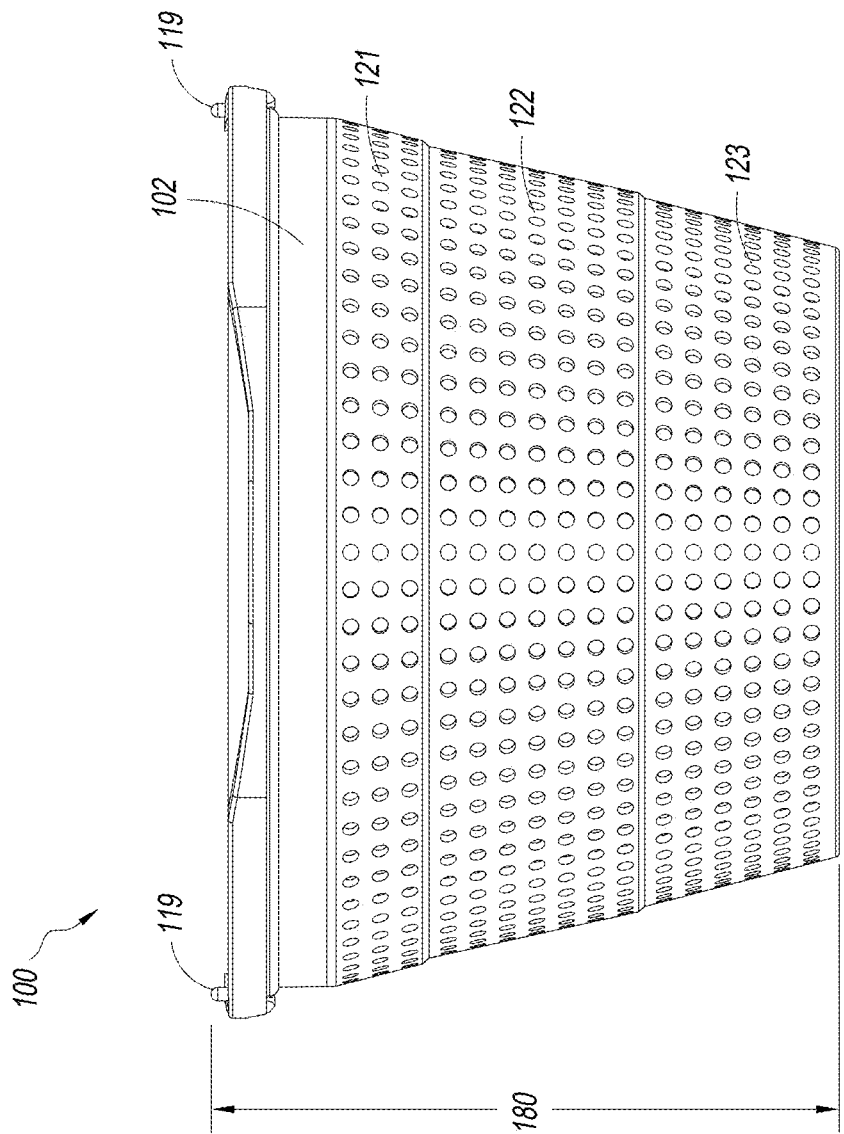
FIG. 1B illustrates a side view of the strainer basket of FIG. 1A.

Although several embodiments, examples, and illustrations are disclosed below, it will be understood by those of ordinary skill in the art that the inventions described herein extend beyond the specifically disclosed embodiments, examples, and illustrations and include other uses of the inventions and obvious modifications and equivalents thereof. Embodiments of the inventions are described with reference to the accompanying figures, wherein like numerals refer to like elements throughout. These drawings are considered to be a part of the entire description of some embodiments of the inventions. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

The disclosure herein provides a variety of embodiments of durable, collapsible, and/or configurable strainer baskets for pool equipment. Such strainer baskets may be used in, for example, a pool skimmer, a pool pump, and/or the like. A strainer basket as disclosed herein may comprise, for example, a rigid annular member coupled to a flexible basket. For example, the rigid annular member may comprise a rigid polymer, and the flexible basket may comprise a flexible silicone material. The rigid annular member may be sized and configured to be used with a variety of different configurations of pool equipment, such as a variety of types of pool skimmers. Further, in some embodiments, the rigid annular member may be configured to be coupled with a second rigid annular member that, for example, increases an effective outer diameter of the strainer basket to enable the strainer basket to more efficiently work with additional configurations of pool skimmers. In some embodiments, the flexible basket is configured to be collapsible upon itself to reduce an overall size of the strainer basket, such as for more efficient shipping or storage.

A typical strainer basket for pool equipment can operate in a relatively harsh environment. For example, the strainer basket may be exposed to harsh chemicals, high temperatures from the pool equipment itself and/or the environment, and significant shock loads when, for example, a pool maintenance person slams the strainer basket on a concrete deck to empty the basket of debris. Each of these conditions can lead to rapid failure of a typical pool strainer basket, thus increasing the potential for damage to pool equipment and also the need to replace the strainer basket quite often, such as once a year or more. Further, since various pool equipment uses various configurations of strainer baskets, it can be burdensome for a pool supply store or manufacturer to keep in stock a sufficient number of strainer baskets for each type of pool equipment. A typical strainer basket is relatively bulky, and keeping a significant inventory of each individual type of basket can be both cost prohibitive and unpractical, due to the amount of space the inventory would take up. Another problem with typical strainer baskets is that they are generally made of relatively cheap and lightweight materials, such as acrylonitrile-butadiene-styrene (ABS). This can be problematic with respect to durability, and can also be problematic with respect to the buoyancy of the strainer basket. When a strainer basket made of a lightweight material is placed in a pool skimmer, the strainer basket may tend to float to the surface of the water, thus allowing debris to go around the strainer basket and potentially damage pool equipment.

The strainer baskets disclosed herein provide various benefits over typical strainer baskets for pool equipment. For example, strainer baskets disclosed herein comprise durable materials, such as silicone, that can stand up better to the harsh environment than a typical strainer basket. Further, strainer baskets disclosed herein may comprise a heavier-weight material, such as silicone, that can help to keep the strainer basket in the desired position in a pool skimmer, instead of tending to float to the surface of the water. Further, strainer baskets disclosed herein may comprise a collapsible basket portion that enables the overall size of the strainer basket to be reduced for shipping and storage. Additionally, strainer baskets disclosed herein may comprise a design that works with a number of different configurations of pool skimmers, thus enabling less inventory to be stored to cover a larger number of configurations of pool skimmers. In some embodiments, such a design may include one or more add-on components, such as a ring, that change the effective outer diameter of the top rim of the strainer basket.

Example Pool Strainer Basket

FIGS. 1A-1H illustrate one example of a durable and collapsible strainer basket 100. FIGS. 1A-1G illustrate various views of the strainer basket 100 in an expanded configuration, and FIG. 1H illustrates the strainer basket 100 in a collapsed configuration.

With reference to FIG. 1A, the strainer basket 100 comprises a rigid annular member 102 connected to a flexible basket 114. The rigid annular member 102 defines a central opening 104 through which, for example, debris may flow when in use in a pool skimmer. The rigid annular member 102 comprises a radially extending rim 106 and a longitudinally downward extending basket support portion 108. The radially extending rim 106 defines an outer surface 110 and a lower surface 112 (see FIG. 1C). The outer surface 110 may, for example, comprise a diameter that is sized to fit within one or more pool skimmer cavities. Further, the lower surface 112 of the rim 106 may be configured to rest on a ledge or shelf of the one or more pool skimmer cavities. The annual rigid member 102 may comprise a high-temperature resistant nylon material or other suitable materials. Using a high-temperature resistant nylon may be desirable, however, because it may stand up to the harsh environment (such as harsh chemicals, temperature extremes, and/or shock loads applied by a user) better than alternative materials, such as ABS.

The radially extending rim 106 comprises a number of features that can enable the strainer basket 100 to be used with a variety of different pool skimmer designs. For example, the outer surface 110 does not necessarily need to form a complete circle (and does not in this example embodiment). In this embodiment, the outer surface 110 comprises two radially recessed regions 111 (see FIGS. 1A and 1D) which cause the overall outer profile shape of the strainer basket, when viewed from the top as in FIG. 1D, to be generally circular in shape, but with two portions cut out of the perimeter of that circle. These recessed regions 111 may, for example, enable the strainer basket 100 to be used in a pool skimmer cavity that comprises one or more radially inward protruding ledges or other features that lock the strainer basket in place in the pool skimmer cavity. For example, the strainer basket 100 may be placed into the skimmer cavity in an orientation where the recessed regions 111 avoid the protruding ledges of the skimmer cavity, and the strainer basket may then be rotated such that the protruding ledges will be positioned above the top surface 113 of the rigid annular member 102, thus physically retaining the strainer basket 100 in the skimmer cavity (e.g., putting the strainer basket 100 into a locked position). As can be seen in FIG. 1A, the strainer basket 100 further comprises a handle 115 connected to the rigid annular member 102, which may be useful in rotating the strainer basket when it is in the skimmer cavity to lock and unlock the strainer basket with respect to the protruding ledges. The handle 115 may also be useful for placing the strainer basket 100 into the skimmer cavity and pulling the strainer basket 100 out of the skimmer cavity.

The handle 115 in this example embodiment comprises a shaft or rod having a first end 115a and a second end 115b. The first end 115a is coupled to the rigid annular member 102 at a first location, and the second end 115b is coupled to the rigid annular member 102 at a second location opposite the first location. In this embodiment, the first and second locations comprise holes in the rigid annular member 102 through which the first and second ends 115a, 115b of the handle 115 pass. Other embodiments may couple the handle 115 to the rigid annular member 102 differently. Some embodiments may not include a handle. Further, some embodiments may utilize a different handle design. For example, instead of using a straight shaft, the handle may comprise a curved shape (such as semicircular) that is pivotally coupled to the rigid annular member 102 (such as at the same first and second locations that the handle 115 is coupled to). In such an embodiment, the curved handle may be configured to be oriented generally horizontally when not being used by a user, and may be configured to be pivotable to a generally vertical orientation when being used by a user (such as when used to extract the strainer basket from a pool skimmer cavity).

Figure 1C:
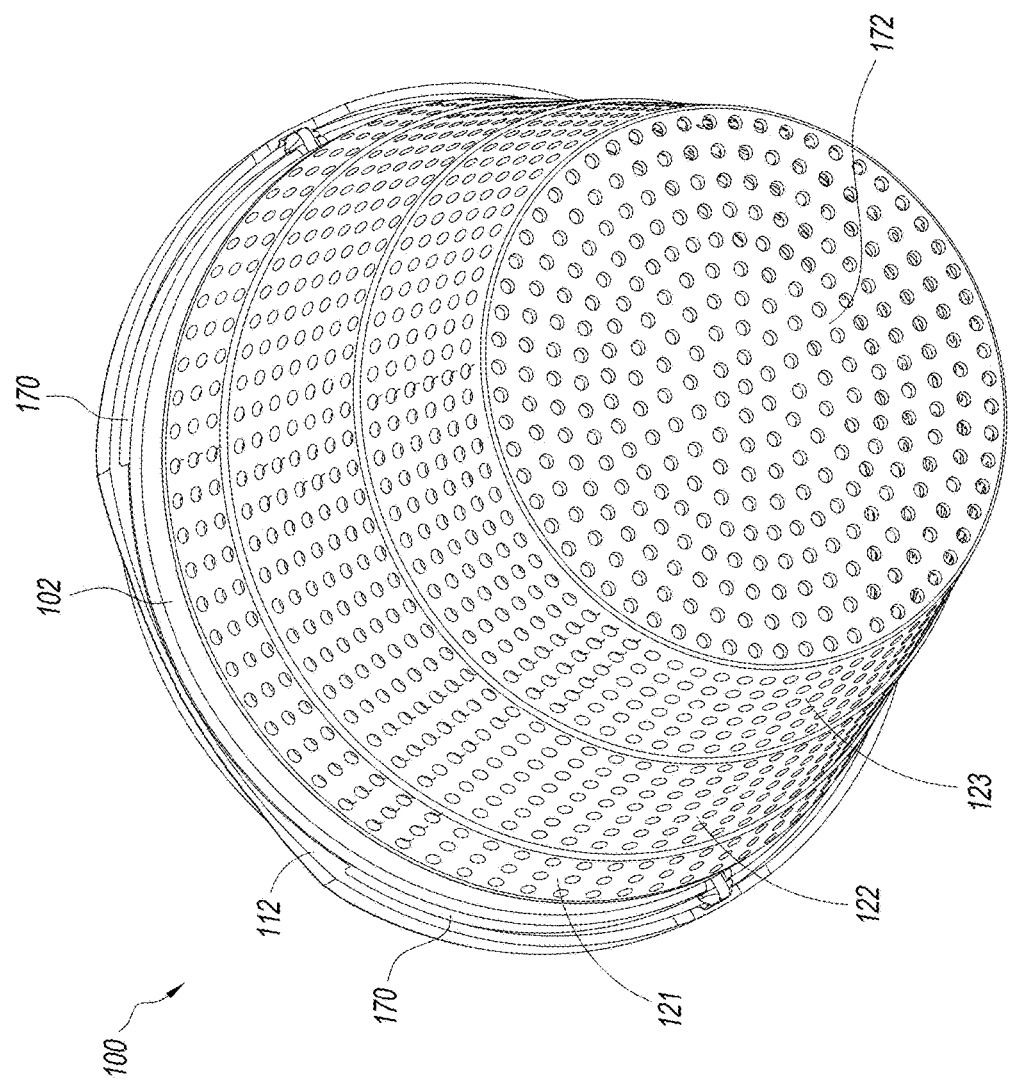
FIG. 1C illustrates a bottom perspective view of the strainer basket of FIG. 1A.
Figure 1D:
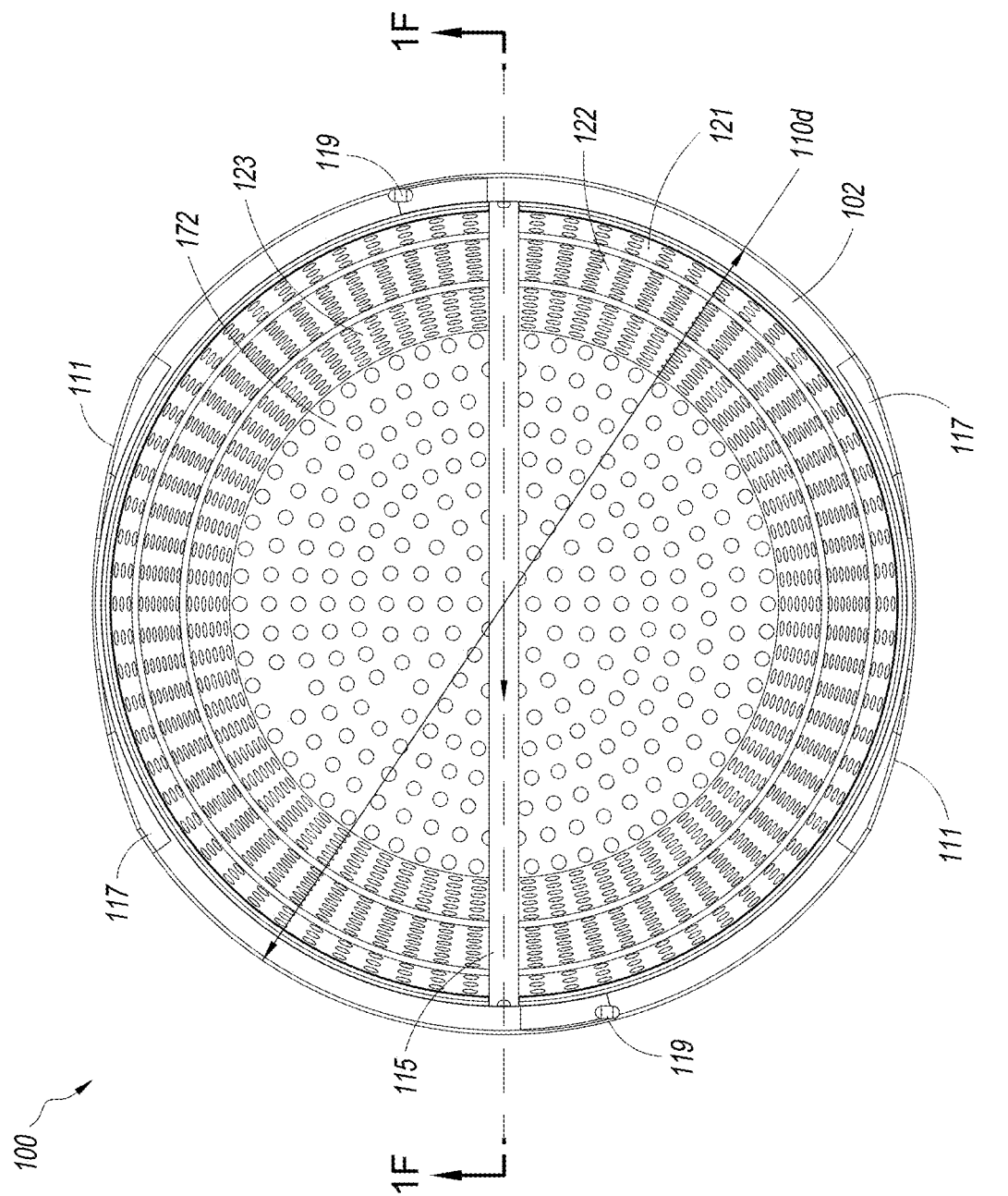
FIG. 1D illustrates a top view of the strainer basket of FIG. 1A.
Figure 1E:
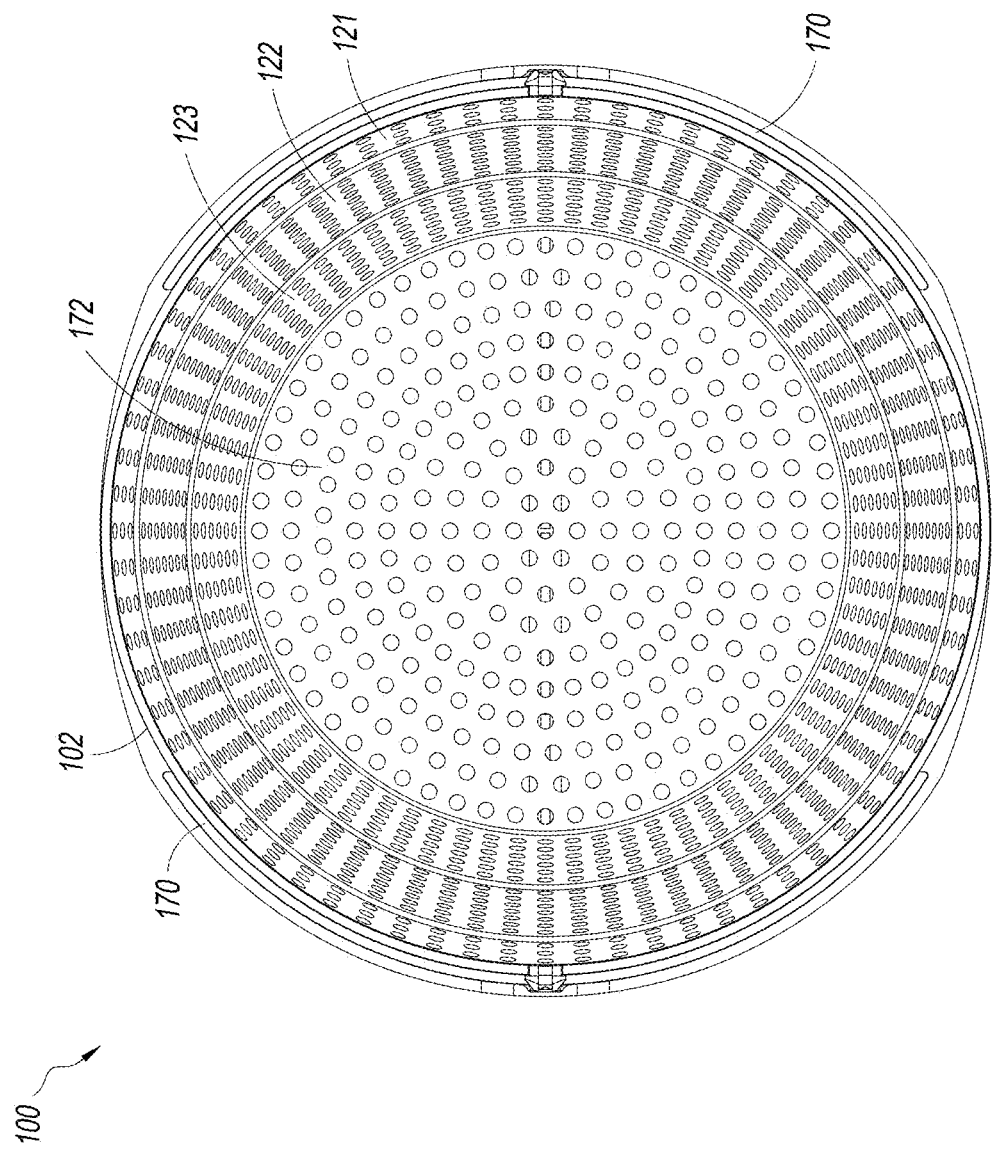
FIG. 1E illustrates a bottom view of the strainer basket of FIG. 1A.

With continued reference to FIGS. 1A and 1D, the strainer basket 100 further comprises two longitudinally recessed regions 117 that are recessed in a longitudinally downward direction with respect to the top surface 113 of the radially extending rim 106. In this embodiment, the longitudinally recessed regions 117 comprise a generally flat central portion and taper upward at either end into the top surface 113. Such a configuration may, for example, make it easier for a user to rotate the strainer basket 100 into the locked or unlocked positions with respect to corresponding protruding ledges or other features of the skimmer cavity. The radially extending rim 106 further comprises in this embodiment two longitudinally protruding posts 119 extending upward away from the top surface 113. These post may, for example, act as a stop feature that are intended to come into contact with a corresponding feature in a pool skimmer cavity to stop the strainer basket 100 from rotating when a user is rotating the strainer basket into a locked or unlocked position within the skimmer cavity.

The outer surface 110 of the radially extending rim 106 may comprise an outer diameter 110d (see FIG. 1D) that is sized to fit within a pool equipment cavity (such as a skimmer cavity) having a particular corresponding inner diameter (such as an inner diameter that is slightly larger than the outer diameter 110d). For example, the outer diameter 110d may be approximately 208 millimeters in some embodiments. In some embodiments, the outer diameter 110d may be within a range of 177-217 millimeters. In some embodiments, as described below with reference to FIGS. 2A-2C, a second rigid annular member may be attached to the first rigid annular member to increase the strainer basket's effective outer diameter, such that the strainer basket can work more efficiently with larger pool equipment cavities. For example, in some embodiments, the outer diameter 110d of the first rigid annular member may be approximately 208 millimeters, and the outer diameter of the second rigid annular member (see, for example, dimension 211d of FIG. 2B) may be approximately 216 millimeters. In some embodiments, the outer diameter 211d of the second rigid annular member 211d is at least 1, 2, 3, 4, 5, 6, 7, 8, 9, 10% larger than the outer diameter 110d of the first rigid annular member. In some embodiments, the outer diameter 211*d* of the second rigid annular member 211*d* is 3-5% larger than the outer diameter 110*d* of the first rigid annular member. In some embodiments, the outer diameter 110*d* of the first rigid annular member is within a range of 205-211 millimeters, and the outer diameter 211*d* of the second rigid annular member is within a range of 213-219 millimeters.

Returning to FIG. 1A, the flexible basket 114 in this embodiment comprises a silicone material. Other embodiments may use different materials. The flexible basket 114 comprises three annular sections 121, 122, 123 that are separated from one another by two annular fold regions 124, 125. The fold regions 124, 125 may help to allow the flexible basket 114 to collapse into a collapsed configuration, as shown in FIG. 1H. Further detail of the fold regions 124, 125 may be seen in the cross-sectional and detail views of FIGS. 1F and 1G. In this embodiment, the fold regions 124, 125 comprise a tapered, reduced thickness region that will generally result in the material of the flexible basket having a lower resistance to bending at that region than at other regions of the basket. Accordingly, when a user places an upward force on the bottom 172 of the flexible basket 114, the flexible basket 114 will desirably bend at the two fold regions 124, 125, and thus collapse into a collapsible configuration as shown in FIG. 1H. In other embodiments, a different number of fold joints may be used, a different configuration of the fold joints may be used, and/or the like. For example, some embodiments may comprise one, three, four, five, or more fold joints, instead of two. Further, some embodiments may comprise two, four, five, or more annular sections, instead of three. Further, in some embodiments, the flexible basket 114 may not be configured to be collapsible, and/or may not include fold joints.

With reference to FIG. 1H, it can be seen that in the collapsed configuration both the bottom annular section 123 and the middle annular section 122 are positioned at least partially within the opening 104 (see FIG. 1A) of the rigid annular member 102. Such a design can, for example, enable the strainer basket to have a significantly shorter height in the collapsed configuration than in the expanded configuration. For example, in some embodiments, the overall height of the skimmer basket in the expanded configuration (shown as dimension 180 in FIG. 1B) is at least twice the overall height of the skimmer basket in the collapsed configuration. In some embodiments, the overall height of the skimmer basket in the collapsed configuration is no more than 30, 40, 50, or 60% of the overall height of the skimmer basket in the expanded configuration. In some embodiments, the bottom and/or middle annular sections 123, 122 may not be configured to extend into or through the opening 104 of the rigid annular member 102. Having those sections extend at least partially into the opening 104 may be desirable, however, to reduce the overall height of the strainer basket in the collapsed configuration.

It should be noted that, in the collapsed configuration shown in FIG. 1H, the handle 115 is not installed. Were the handle 115 to be installed, it may cause some deformation of the bottom and middle annular sections 123, 122 in the collapsed configuration, though that may not be an issue. Desirably, however, the collapsed configuration may be used primarily for shipping and storage of the strainer basket, and the handle may be removed from the rigid annular member during such shipping and storage. Also, as described above, some embodiments may comprise a differently shaped handle, such as a curved handle, and such a handle may not interfere with the bottom and middle annular sections 123, 122 in the collapsed configuration.

In this embodiment, the flexible basket 114 comprises a single unitary structure (e.g., a one-piece structure) that is desirably produced by molding silicone. For example, in this embodiment, the three annular sections 121, 122, 123 and the two fold regions 124, 125 are all part of a single unitary silicone structure. This can be desirable for many reasons, such as increased durability, more efficient manufacturing, easier control of material thickness and weight, and/or the like. Further, having the annular sections 121, 122, and 123 be flexible (in addition to the fold regions 124 and 125) can be desirable to, for example, be more durable when a user strikes the side of the basket against a hard surface, enable a user to more easily turn the basket "inside out" for cleaning, and/or the like. Various other embodiments may use other configurations, such as having the annular sections be separate structures (flexible or rigid) that are connected to the fold regions (such as by adhering them, insert molding them, and/or the like) to form an assembly. Further, some embodiments may include one or more rigid portions of the flexible basket 114, while other portions are flexible. For example, one or more of the annular sections 121, 122, 123 and/or the bottom portion 172 may comprise a rigid structure in some embodiments.

As can be seen in FIG. 1A, the flexible basket 114 comprises a plurality of holes 116 arranged in a regular pattern. These holes 116 are designed to desirably allow water to pass therethrough, but to not allow debris (of a sufficient size) to pass therethrough, thus protecting downstream pool equipment from the debris. In this embodiment, the holes 116 are approximately 3 millimeters in diameter, although other sizes may be used. The type, size, and pattern of holes 116 in this embodiment is exemplary, and various other embodiments may utilize different types, sizes, and/or patterns of holes.

Figure 1G:
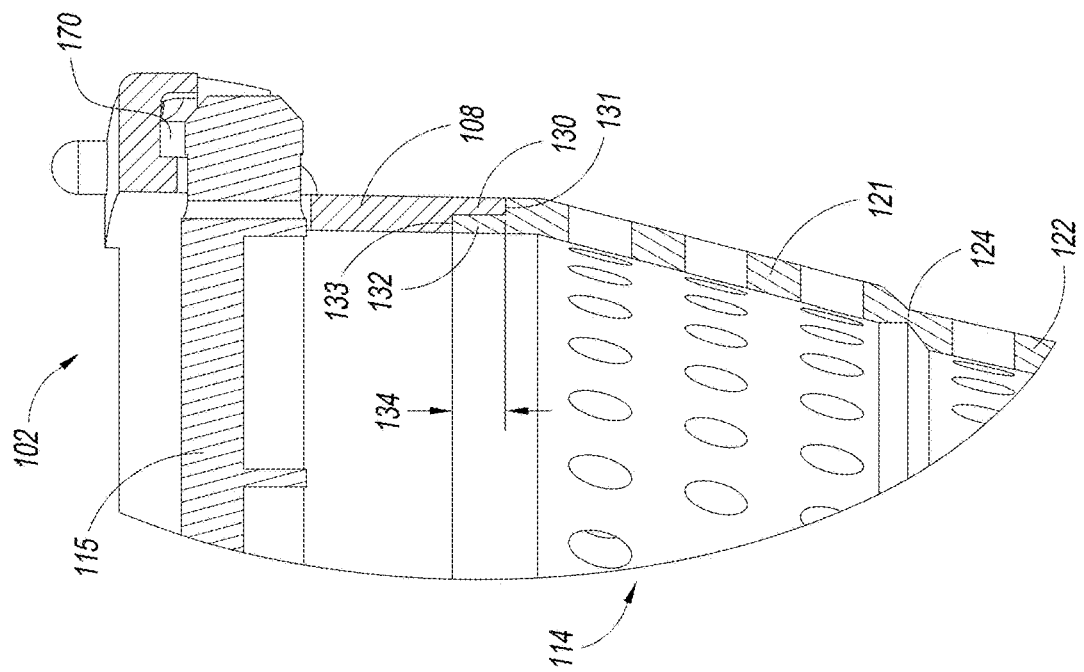
FIG. 1G illustrates an enlarged detail view of the cross-sectional view of FIG. 1F.
Figure 1F:
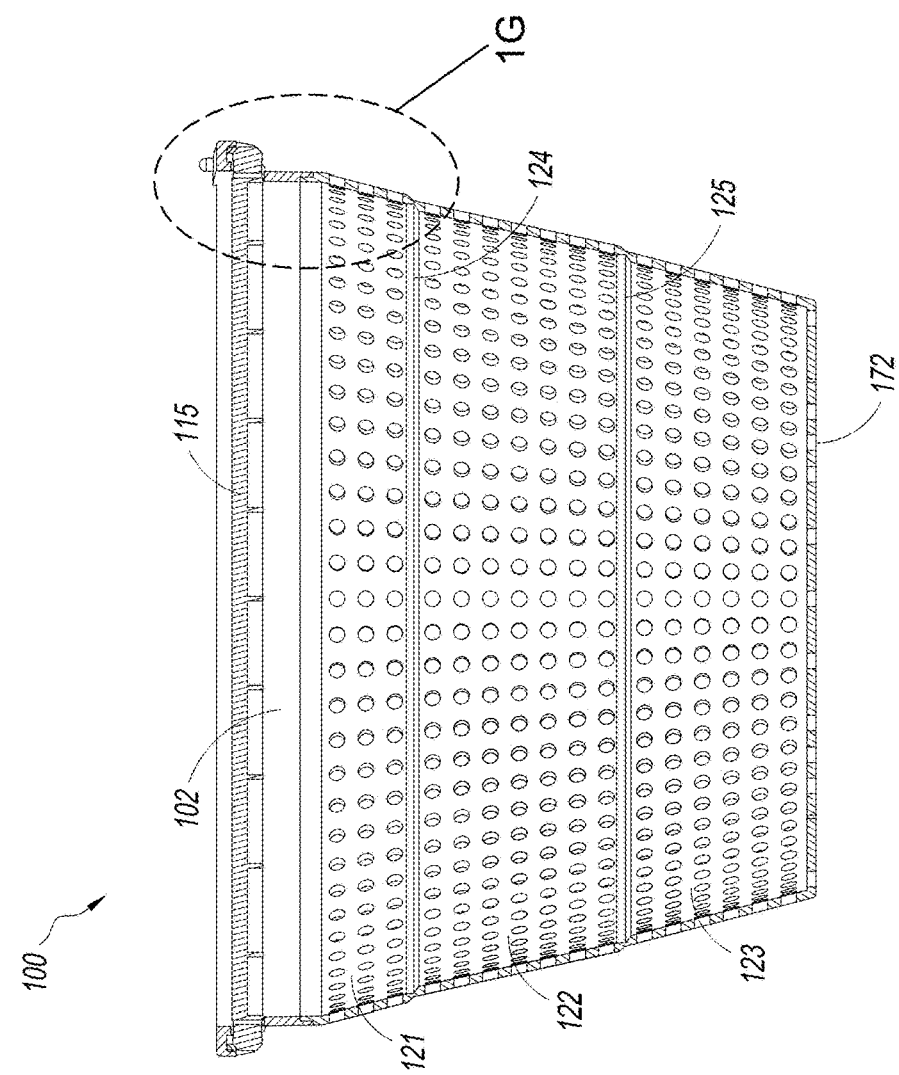
FIG. 1F illustrates a side cross-sectional view of the strainer basket of FIG. 1A.

With reference to FIG. 1G, the interface between the flexible basket 114 and rigid annular member 102 is shown. Specifically, the flexible basket 114 comprises a longitudinally extending member 132 that extends upward and fits within an annular region created by longitudinally extending member 130, which is a portion of the basket support portion 108 that extends downward. At the junction between longitudinally extending members 130, 132, the flexible basket 114 may be joined to the rigid annular member 102 using, for example, an adhesive. By adhering the basket 114 to the rigid member 102 along such a longitudinally oriented annular joint, the shear strength of the joint can be greater than if the basket were merely adhered to the rigid member along a radially oriented surface. This is not to say, however, that the radially oriented surfaces of the flexible basket 114 and rigid annular member 102 may not also be adhered together. For example, in the embodiment shown in FIG. 1G, it is desirable that the radially oriented joints 131 and 133 (at the lowest surface of member 130 and the highest surface of member 132, respectively) also be adhered together.

In the embodiment of FIG. 1G, a height 134 of the adhesion joint is approximately 5 mm. In other embodiments, however, the height 134 of the adhesion joint may be increased or decreased based on the strength of the joint desired and/or the adhesion properties of the adhesive used. For example, some embodiments may comprise a height 134 of approximately 12 mm. As other examples, some embodiments may comprise a height 134 that is within a range of 3-20 mm, 5-15 mm, 8-15 mm, and/or the like. As another example, some embodiments may comprise a height 134 that is equal to or greater than 4, 5, 6, 7, 8, 9, 10, 11, 12, 13, 14, or 15 mm. In some embodiments, an adhesive designed for bonding unvulcanized silicone elastomers to rigid substrates may be used. For example, CHEMLOK® 608 Adhesive, manufactured by LORD Corporation, or other suitable adhesives may be used.

Further, in some embodiments, other joinery techniques may be used, in addition to or in lieu of adhesives. For example, the flexible basket 114 may be insert molded to the rigid member 102. Further, although this embodiment illustrates a single longitudinally extending member 130 extending downward from the rigid annular member 102, and a single longitudinally extending member 132 extending upward from the flexible basket 114, other embodiments may comprise more than one longitudinally extending member. For example, a recess may be formed between two longitudinally extending members of the rigid member 102 and/or basket 114 that allow for adhesion to occur on both radially inner and radially outer sides of the recess.

In some embodiments, the flexible basket 114 may completely surround or enclose the rigid annular member 102, such as by having the rigid annular member 102 be insert molded within the material that forms the flexible basket 114. It can be desirable to have a majority of the rigid annular member 102 be exposed (such as most or all of the portions of the rigid annular member 102 that are not part of the joint between members 130 and 132), however, so that the rigid surfaces of the rigid annular member 102 (such as outer surface 110 and lower surface 112) can be used to guide and position the strainer basket with respect to the corresponding pool equipment cavity surfaces. If silicone from the flexible basket 114 covered the outer and lower surfaces 110, 112 of the rigid annular member 102, this may introduce various disadvantages, such as greater tolerance variances, greater friction between the strainer basket and the pool equipment cavity surfaces, and/or the like. Accordingly, although it is possible to have the rigid annular member 102 be enclosed within the flexible basket material, it is desirable to have a majority of the rigid annular member 102 be exposed.

Example Modular Pool Strainer Baskets

Figure 2A:
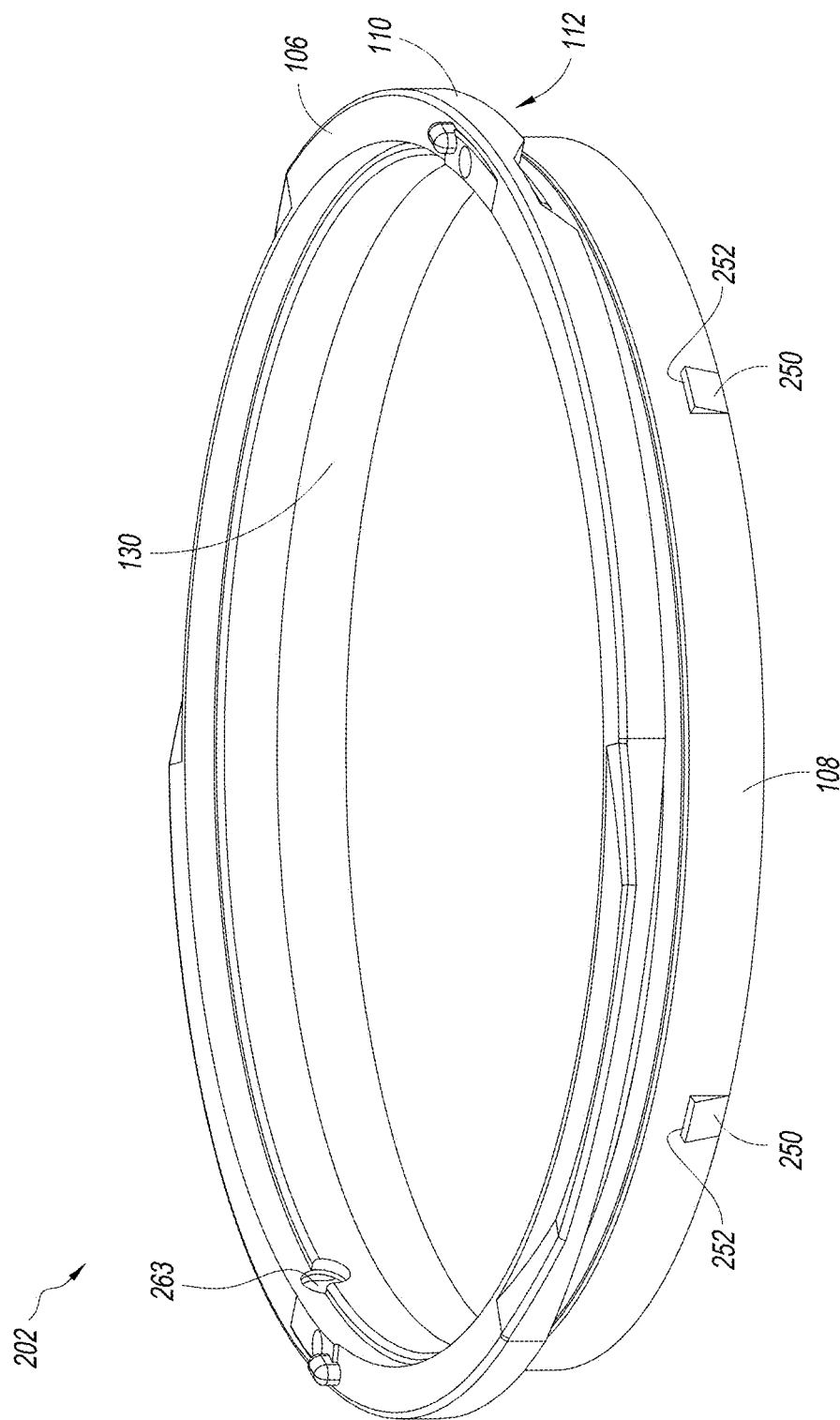
FIG. 2A illustrates a top perspective view of a first rigid annular member of a strainer basket according to another embodiment.
Figure 2B:
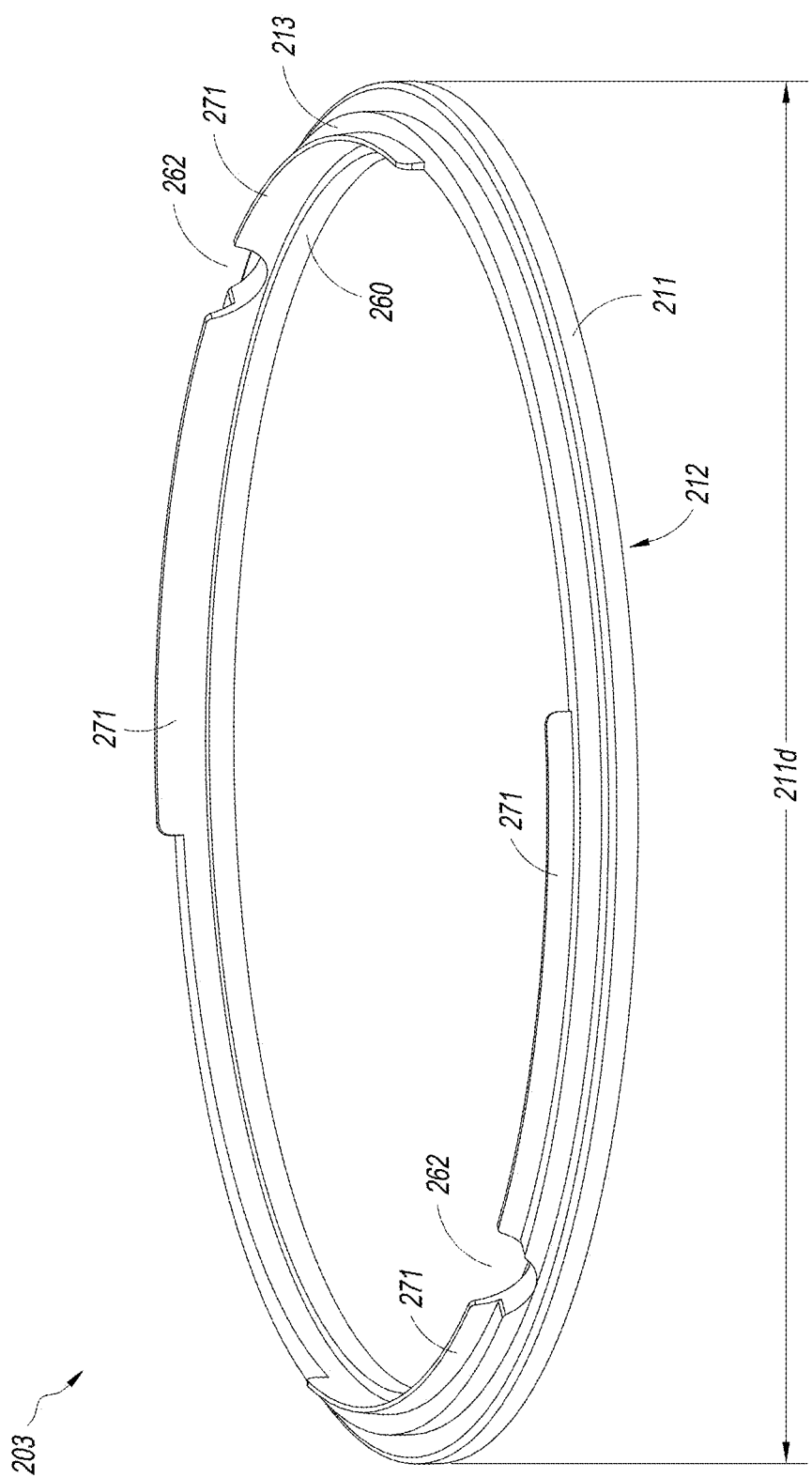
FIG. 2B illustrates a top perspective view of a second rigid annular member of the strainer basket of FIG. 2A.
Figure 2C:
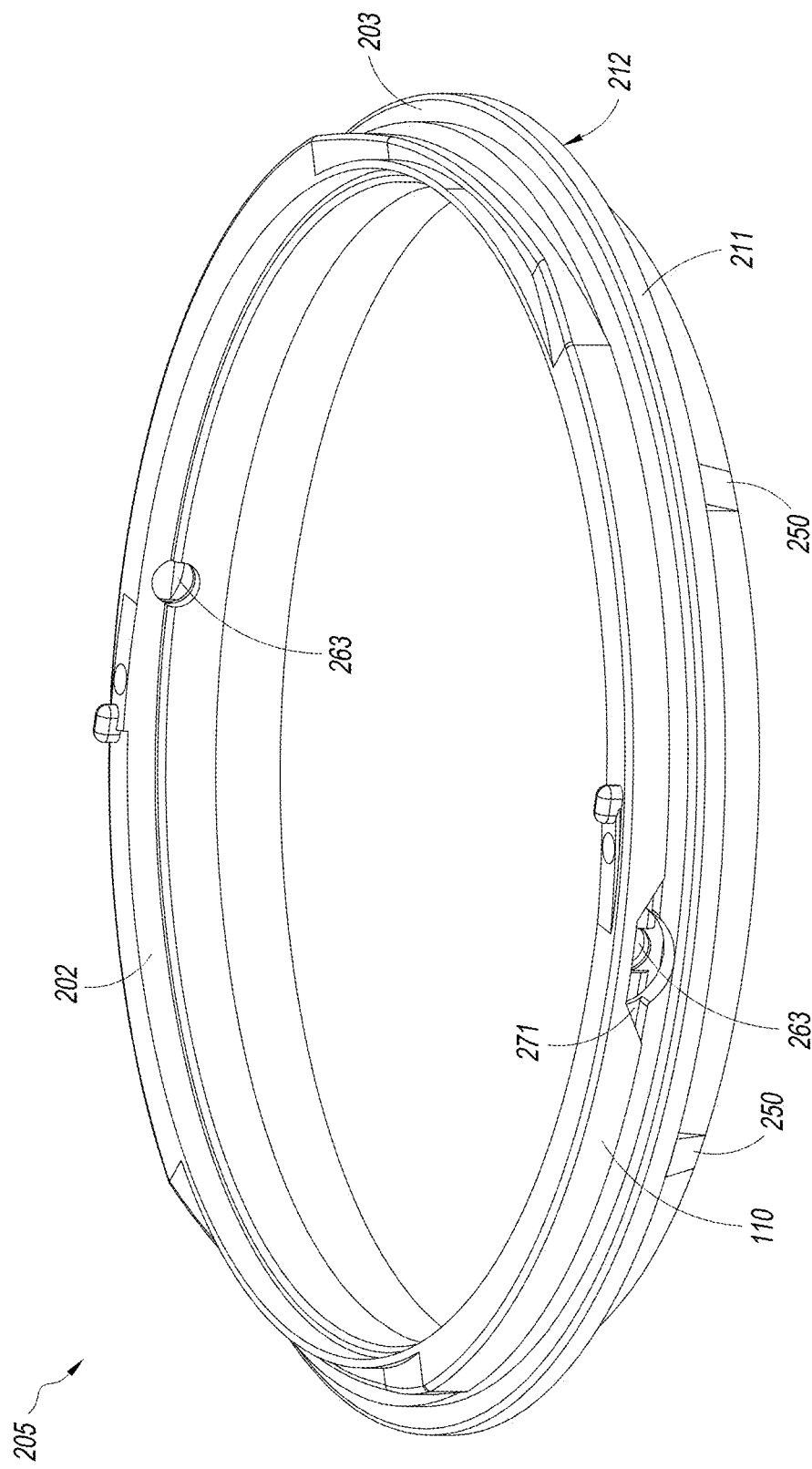
FIG. 2C illustrates a top perspective view of the second rigid annular member of FIG. 2B coupled to the first rigid annular member of FIG. 2A.

Some embodiments of pool strainer baskets disclosed herein comprise the ability to have one or more additional structures added to the rigid annular member to adapt the strainer basket to a wider variety of pool equipment, such as pool skimmer, configurations. FIGS. 2A-2C and 3A-3C illustrate two such embodiments. With reference to FIGS. 2A-2C, FIG. 2A illustrates a first annular rigid member 202 that is similar in design to the rigid annular member 102 of FIG. 1A. For brevity, the current discussion focuses on only differences from the rigid annular member 102, and the same or similar reference numbers are used to refer to the same or similar features. Further, although FIG. 2A illustrates only the rigid annular member, the rigid annular member 202 may be coupled to a flexible basket, such as a flexible basket similar to the flexible basket 114 illustrated in FIG. 1A, using similar techniques as described above.

One difference from the rigid annular member 102 is that the basket support portion 108 of rigid annular member 202 comprises a longer longitudinally extending member 130. In the embodiment of FIG. 2A, the longitudinally extending member 130 is approximately 12 mm long (referring to dimension 134 shown in FIG. 1G), instead of 5 mm long. Desirably, the longitudinally extending member 132 of the flexible basket (see FIG. 1G) is also approximately 12 mm long, to match the longitudinally extending member 130. This may, for example, allow for a larger surface area contact in the adhesive joint, and thus increased durability of the joint. Any of the dimensions 134 or ranges of dimensions 134 discussed above with reference to FIG. 1G may also be used with the embodiment shown in FIG. 2A.

Another difference from the rigid annular member 102 is that the longitudinally extending basket support portion 108 of annular rigid member 202 comprises a plurality of tabs 250 extending radially outward therefrom. The tabs 250 desirably comprise a tapered shape that is thinner closer to the bottom of the basket support portion 108 and thicker further from the bottom of the basket support portion 108. Further, the tabs 250 desirably comprise a generally flat top surface 252. The tabs 250 can desirably operate to create a snap fit with a second rigid annular member, as further described below. The perspective view of FIG. 2A shows two of the tabs 250, although the rigid annular member 202 desirably comprises six total tabs 250, spaced evenly around the longitudinally extending basket support portion 108. Other embodiments may include more or fewer tabs 250. Further, some embodiments may not distribute the tabs 250 evenly about the basket support portion 108. In this embodiment, the tabs 250 are desirably approximately 10 mm wide (measured horizontally parallel to a line tangent to the outer surface of the basket support portion 108), 4.5 mm tall (measured vertically), and protrude radially from the outer surface of the basket support portion 108 by approximately 1.5 mm (at the thickest portion of the tapered shape). Further, in this embodiment, the tapered shape of the tabs 250 is desirably inclined away from the outer surface of the basket support portion 108 at an angle of approximately 16 degrees. Other embodiments may utilize different dimension for the tabs 250 as long as the tables 250 are able to perform their function of retaining a second rigid annular member to the first rigid annular member.

FIG. 2B illustrates a second rigid annular member 203. The second rigid annular member 203 can be configured to be coupled to the first rigid annular member 202 in order to enable the strainer basket to be used with a broader range of pool equipment. FIG. 2C illustrates an assembly 205 that shows the second rigid annular member 203 coupled to the first rigid annular member 202. Returning to FIG. 2B, the second rigid annular member 203 comprises an inner surface 260 that is desirably cylindrical in shape and sized to be a slip or clearance fit with the outer surface of the longitudinally extending basket support portion 108 of the first rigid annular member 202 (see FIG. 2A). Further, a height of the second rigid annular member 203, as measured between the top surface 213 and lower surface 212, is designed to be close to, but less than, a distance between the lower surface 112 of the rim 106 and the top surface 252 of the tabs 250 (see FIG. 2A). Accordingly, the second rigid annular member 203 can be inserted onto the longitudinally extending basket support portion 108 from the bottom, forced over the tapered surfaces of the tabs 250, and snapped into place between the lower surface 112 and top surface 252 (for example, into the installed position shown in FIG. 2C).

When in the position shown in FIG. 2C, the top surface 213 of the second rigid annular member 203 is desirably in contact with or adjacent to the lower surface 112 of the rim 106 of the first rigid annular member 202. Further, the outer surface 211 and lower surface 212 of the second rigid annular member 203 are desirably sized and configured such that they fit into a pool equipment cavity, such as a pool skimmer cavity, and position the strainer basket with respect to the pool equipment cavity. Desirably, the outer surface 211 of the second rigid annular member 203 comprises a larger diameter 211d than the diameter 110d of the outer surface 110 of the first rigid annular member 202, such that using the second rigid annular member 203 can configure the strainer basket to work more effectively with a larger diameter pool equipment cavity.

With reference to FIG. 2B, the second rigid annular member 203 also comprises longitudinally upward extending members 271 extending upward from top surface 213. The upward extending members 271 are desirably sized such that they can fit into a corresponding cavity or cavities of the first rigid annular member 202, such as the longitudinally recessed portions 170 shown in FIGS. 1C, 1E, and 1G. This can, for example, help to rotationally orient the second rigid annular member 203 in a desired orientation with respect to the first rigid annular member 202. This may be desirable, for example, to ensure that cutouts, voids, or cavities 262 of the second rigid annular member 203 are generally aligned with holes 263 of the first rigid annular member 202, so that the second rigid annular member 203 does not interfere with a handle that may be inserted through and extend radially outward beyond holes 263. Upward extending members 271 are one example of such an anti-rotate features, and various other features could be used, such as one or more pins, detents, splines, and/or the like. Further, some embodiments may not include any anti-rotate feature that prevents the second rigid annular member 203 from rotating with respect to the first rigid annular member 202.

In some embodiments, the second rigid annular member 203 is intended to also be removable from the first rigid annular member 202, such as to convert the strainer basket into a different configuration that works with a different pool equipment cavity. In other embodiments, the second rigid annular member 203 is intended to be permanently installed to the first rigid annular member 202, and it may be difficult or impossible to remove the second rigid annular member 203 from the first rigid annual member 202 without damaging one or both of them.

Other methods of attaching a second rigid annular member to a first rigid annular member may be used. For example, one of the rigid annular members may comprise one or more longitudinally recessed portions, and the other rigid annular member may comprise corresponding longitudinally extending protrusions that fit into the longitudinally recessed portions. The protrusions may be held into the recessed portions via friction, adhesive, a snap fit, and/or the like. Further, the inner surface 260 of the second rigid annular member may be sized such that it has somewhat of an interference fit with the outer surface of the basket support portion 108, such that no further retention components are needed.

As one example of an alternative retention method, with reference to FIG. 1C, the lower surface 112 of the rim comprises a plurality of longitudinally recessed portions 170. Although the embodiment shown in FIGS. 2B and 2C includes upward extending portions 271 that fit within such recessed portions to anti-rotate the second rigid annular member with respect to the first rigid annular member, an alternative version of the second rigid annular member 203 of FIG. 2B could be designed such that there is an interference fit, snap fit, and/or the like between the upward extending portions 271 and recessed portions 170, such that the second rigid annular member is also longitudinally retained with respect to the first rigid annular member by the upward extending portions.

Figure 3A:
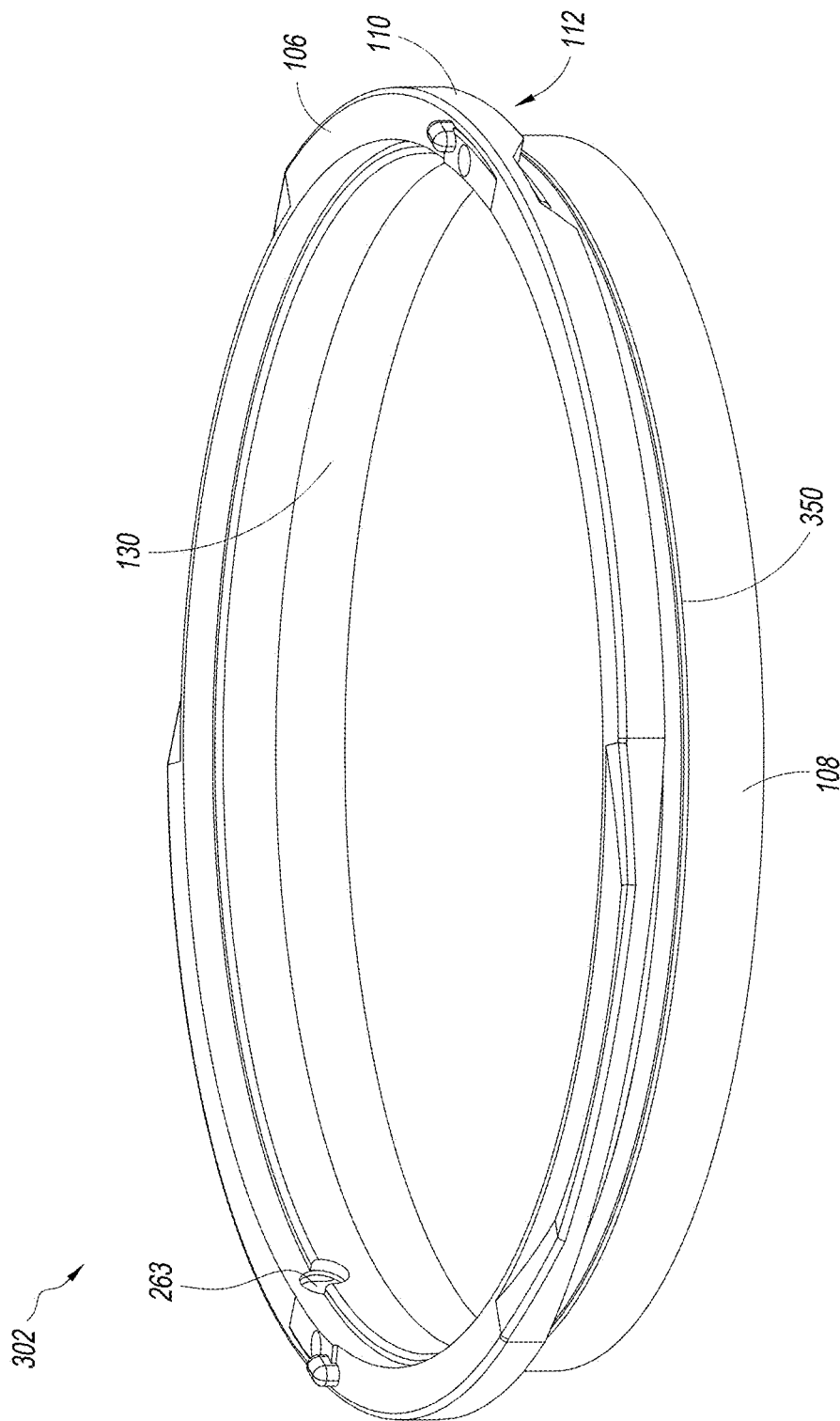
FIG. 3A illustrates a top perspective view of a first rigid annular member of a strainer basket according to another embodiment.
Figure 3B:
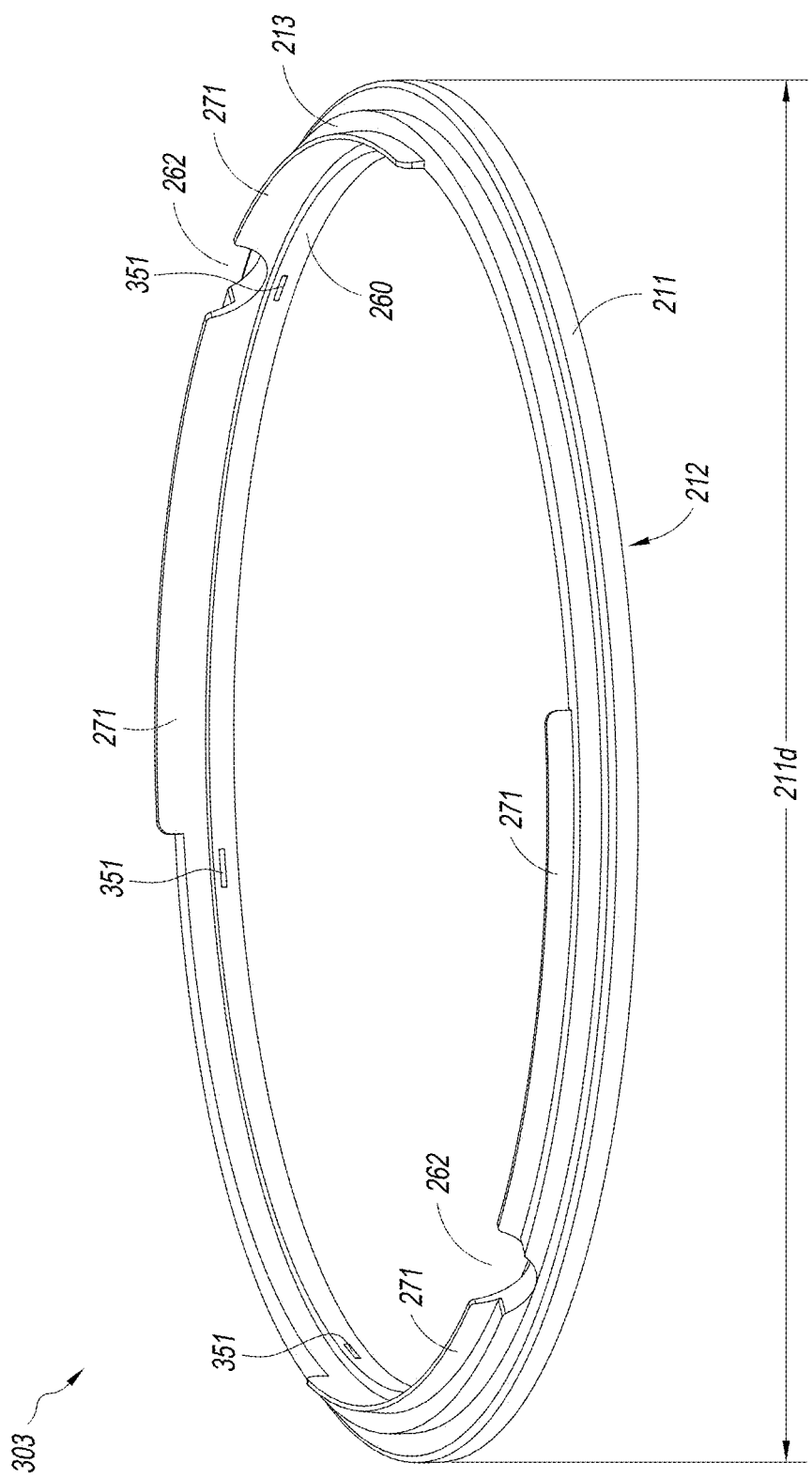
FIG. 3B illustrates a top perspective view of a second rigid annular member of the strainer basket of FIG. 3A.
Figure 3C:
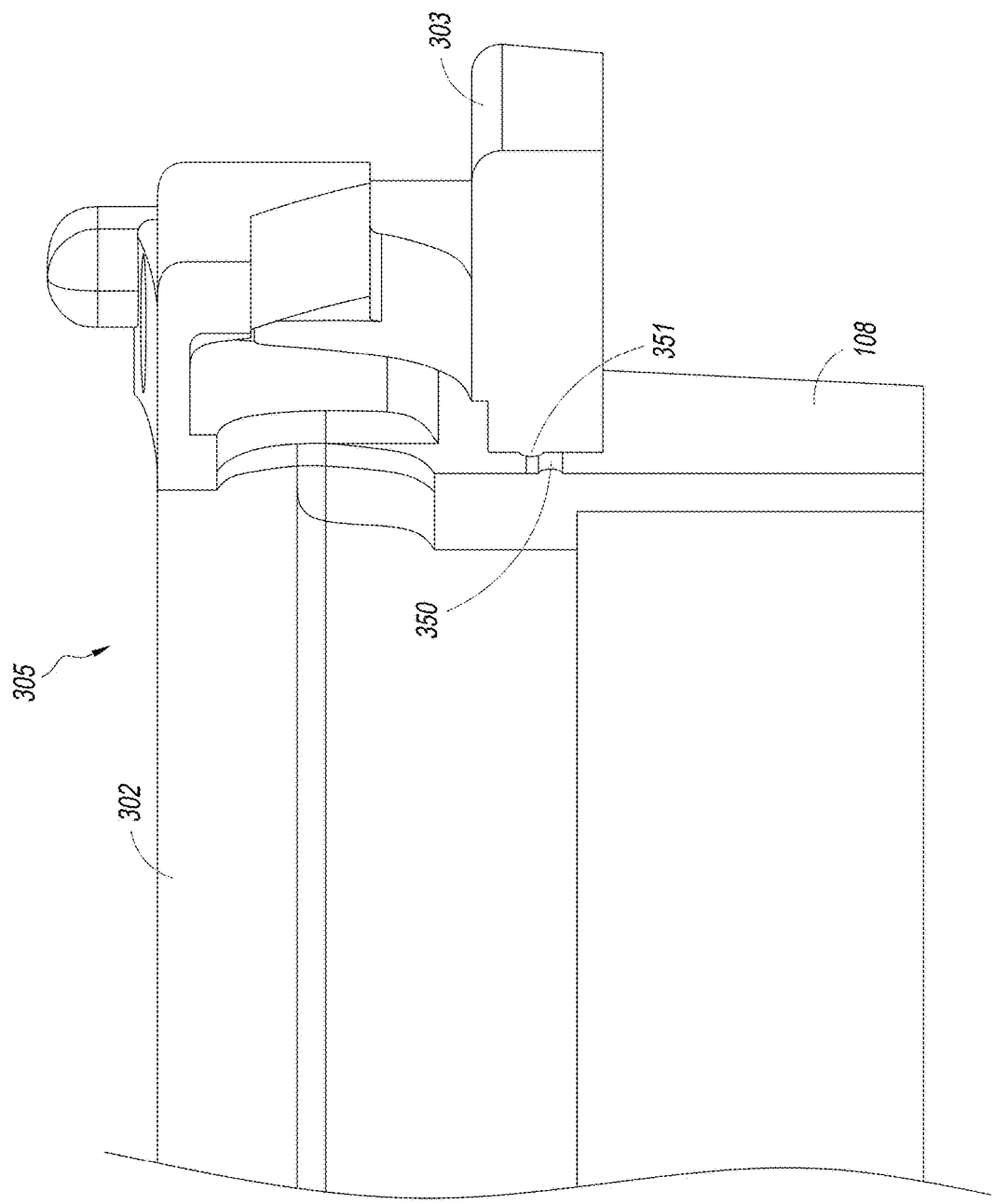
FIG. 3C illustrates a detail cross-sectional view of the second rigid annular member of FIG. 3B coupled to the first rigid annular member of FIG. 3A.

FIGS. 3A-3C illustrate another example embodiment of an alternative retention method to hold the second rigid annular member in place with respect to the first rigid annular member. FIG. 3A illustrates a first rigid annular member 302, FIG. 3B illustrates a second rigid annular member 303, and FIG. 3C illustrates a detail cross-sectional view of an assembly 305 comprising the first rigid annular member 302 and second rigid annular member 303. The first rigid annular member 302 and second rigid annular member 303 are similar in design to the first rigid annular member 202 and first rigid annular member 203 shown in FIGS. 2A and 2B, except for the retention method. Instead of using tabs radially extending outward from the basket support portion 108, the first rigid annular member 302 comprises a radial protrusion 350 that protrudes radially outward and extends all the way around the circumference of the basket support portion 108 (although other embodiments may not have the radial protrusion 350 extending all the way around the circumference and/or may use multiple radial protrusions). Further, the second rigid annular member, shown in FIG. 3B, includes a plurality of inwardly extending tabs 351 positioned about inner surface 260. The cross-sectional view of FIG. 3C illustrates one of those inwardly extending tabs 351 positioned adjacent to and slightly above the radial protrusion 350.

Desirably, in use, when a user wishes to attach the second rigid annular member 303 to the first rigid annular member 302, as shown in FIG. 3C, the user can slide the second rigid annular member 303 upward and force the plurality of inwardly extending tabs 351 over the radial protrusion 350. Once the inwardly extending tabs 351 have been forced over the radial protrusion 350, the inwardly extending tabs 351 and radial protrusion 350 will desirably retain the second rigid annular member 303 in place with respect to the first rigid annular member 302. One advantage of this retention method over the tabs 250 illustrated in FIG. 2A is that the retention features may not be visible to a user of the device once the second rigid annual member is installed. This may, for example, help to avoid pinch points that could potentially pinch a user's finger. In some embodiments, the radial protrusion 350 may instead be replaced by a radial recess that the inwardly extending tabs 351 fit into. In some embodiments, both a radial protrusion and a radial recess may be used. For example, the inwardly extending tabs 351 may be forced over the radial protrusion and then be positioned into the radial recess.

Additional Embodiments and Benefits

Some embodiments of strainer baskets disclosed herein may comprise different or additional features than those described above. For example, although having a flexible basket provides various benefits, in some embodiments it may be desirable to have at least some portion of the flexible basket be less flexible and/or reinforced. For example, it may be desirable to have the portion of the flexible basket that is intended to be adjacent to a suction hole in a pool skimmer to be reinforced, such as to reduce a possibility that the flexible basket portion could be deformed toward and come into contact with that suction hole, potentially plugging the hole. For example, some or all of the bottom portion 172 (see FIG. 1C) could include one or more stiffening ribs, such as a rib comprising a stiffer material such as a stiffer polymer or metal, adhered thereto or insert molded within the flexible material. Further, in some embodiments, the bottom portion 172 of the strainer basket may comprise a rigid material that is connected to flexible annular section 123. Further, in some embodiments it may be desirable for one or more of the annular sections 121, 122, 123 to comprise a reinforced region. Such a reinforced region could be accomplished similarly, such as by adhering thereto or molding within the flexible material a rib comprising a stiffer or more rigid material.

As discussed above, it can be desirable for the flexible basket 114 to comprise a flexible material, such as silicone, that has a greater density or weight than a typical strainer basket material (such as ABS). One benefit of such a greater weight is that the strainer basket may tend to remain in place in a pool skimmer cavity better than a lighter strainer basket formed of a lighter rigid material. Further, such a silicone basket may be heavy enough to stay in place without any auxiliary weights. Some rigid strainer baskets, on the other hand, may include a weight attached to the basket to counter the buoyancy of the lightweight rigid material. This can complicate and increase the cost of manufacturing. In some embodiments, however, it may be desirable to include a weight in a strainer basket as disclosed herein. For example, a weight could be adhered to or insert molded within the flexible basket material 114 and/or the material of the rigid annular member 102. The embodiment illustrated in FIG. 1A comprises a silicone basket 114 that comprises a wall thickness of approximately 2 millimeters. Other thicknesses may be used, however, and in some embodiments it may be desirable to increase or decrease the silicone wall thickness to adjust the weight of the silicone basket portion. Further, it may be desirable in some embodiments to adjust the composition of the silicone material itself to have a higher or lower density to, for example, adjust the weight of the silicone basket portion without having to (or in addition to) adjust the wall thickness.

Another benefit of using a heavier-weight material for the flexible basket 114, such as silicone, is that it may lower the center of gravity of the overall strainer basket 100 as compared to a typical strainer basket formed of a lightweight rigid material. Having a lower center of gravity can also help to retain the strainer basket in an appropriate orientation in a pool equipment cavity. In some embodiments, the design of a strainer basket as disclosed herein is such that the center of gravity is desirably below a vertical midpoint in the height 180 (FIG. 1B) of the strainer basket 100. In some embodiments, the center of gravity is desirably within a bottom third of the height 180.

Although the designs illustrated in the accompanying figures are generally described with reference to a pool skimmer, they may also be used in other pool equipment, such as pool pumps. Further, the techniques disclosed herein may also be utilized in strainer baskets that have applications in other areas in addition to pool equipment.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present inventions herein disclosed should not be limited by the particular disclosed embodiments described above.

What is claimed is:

1. A strainer basket for pool equipment, the strainer basket comprising:
   a rigid annular top portion comprising a central opening and a radially extending rim; and
   a collapsible basket extending downward from the rigid annular top portion,
   the radially extending rim of the rigid annular top portion comprising a downward facing surface that extends radially outward beyond the collapsible basket and that is positioned to rest on a ledge of a pool equipment cavity,
   wherein the collapsible basket comprises a bottom portion and a tapered outer shape, the tapered outer shape formed by two or more annular sections,
   the two or more annular sections and the bottom portion each having a plurality of holes to allow a liquid to pass therethrough,
   wherein the two or more annular sections are configured to be collapsible such that the collapsible basket comprises a collapsed configuration and an expanded configuration, wherein a height of the strainer basket is smaller with the collapsible basket in the collapsed configuration than with the collapsible basket in the expanded configuration, and
   wherein at least part of the collapsible basket comprises a flexible silicone, and at least part of the collapsible basket comprises a rigid material.

2. The strainer basket of claim 1, wherein the bottom portion of the collapsible basket comprises the rigid material, and the two or more annular sections each comprise the flexible silicone.

3. The strainer basket of claim 2, wherein at least one of the two or more annular sections also comprises the rigid material.

4. The strainer basket of claim 1, wherein at least one of the two or more annular sections comprises the rigid material.

5. The strainer basket of claim 1, wherein the at least part of the collapsible basket that comprise the rigid material also comprises the flexible silicone, with the rigid material being adhered to or molded within the flexible silicone.

6. The strainer basket of claim 1, wherein the rigid material comprises a metal or a polymer that is stiffer than the flexible silicone.

7. The strainer basket of claim 6, wherein the rigid annular top portion comprises a same metal or polymer as the rigid material.

8. The strainer basket of claim 1, wherein the at least part of the collapsible basket that comprises the flexible silicone comprises a wall thickness of at least 2 millimeters.

9. A strainer basket for pool equipment, the strainer basket comprising:
   an annular top portion comprising a rigid material; and a collapsible basket extending downward from the annular top portion, wherein the collapsible basket comprises a bottom portion and a tapered outer shape, the tapered outer shape formed by two or more annular sections, wherein the two or more annular sections are configured to be collapsible such that the collapsible basket comprises a collapsed configuration and an expanded configuration, wherein a height of the strainer basket is smaller with the collapsible basket in the collapsed configuration than with the collapsible basket in the expanded configuration, wherein the collapsible basket comprise a plurality of holes to allow a liquid to pass therethrough, wherein the collapsible basket comprises a flexible material, and wherein at least one of the bottom portion or at least one of the two or more annular sections comprises a reinforced region comprising a rigid material.

10. The strainer basket of claim 9, wherein the rigid material of the annular top portion and the rigid material of the reinforced region are a same type of material.

11. The strainer basket of claim 10, wherein the type of material is a nylon material.

12. The strainer basket of claim 9, wherein the flexible material is silicone.

13. The strainer basket of claim 9, wherein the reinforced region comprises one or more stiffening ribs adhered to or molded within the flexible material.

14. A silicone strainer basket for pool equipment, the silicone strainer basket comprising:

a top portion comprising an annular shape that defines a central opening; and a strainer portion connected to the top portion, wherein the strainer portion comprises an annular wall extending downward from the top portion and a floor positioned at a lower end of the annular wall such that the strainer portion defines a basket for collection of debris, wherein the strainer portion comprises a plurality of openings to allow water to pass therethrough, wherein the strainer portion comprises silicone, and the top portion comprises a material having a greater stiffness than the silicone of the strainer portion, and wherein at least a portion of the strainer portion comprises a reinforced region comprising a material having a greater stiffness than the silicone of the strainer portion.

15. The silicone strainer basket of claim 14, wherein the material of the top portion that has a greater stiffness than the silicone and the material of the reinforced region that has a greater stiffness than the silicone are a same type of material.

16. The silicone strainer basket of claim 15, wherein the type of material is a nylon material.

17. The silicone strainer basket of claim 14, wherein the floor of the strainer portion is the reinforced region.

18. The silicone strainer basket of claim 14, wherein at least a portion of the annular wall of the strainer portion is the reinforced region.

19. The silicone strainer basket of claim 14, wherein each of the floor of the strainer portion and the annular wall of the strainer portion comprises a reinforced region comprising a material having a greater stiffness than the silicone of the strainer portion.

20. The silicone strainer basket of claim 14, wherein the reinforced region comprises one or more stiffening ribs adhered to or molded within the silicone.

\* \* \* \* \*